United States Patent [19]

Wible et al.

[11] Patent Number: 5,564,513
[45] Date of Patent: Oct. 15, 1996

[54] AIR FILTER HOUSING FOR AUTOMOBILE INTERNAL COMBUSTION ENGINE

[75] Inventors: Dan S. Wible, Seattle, Wash.; Steve Gregory, Signal Hill, Calif.

[73] Assignee: Automotive Performance International, Inc., Sea Tac, Wash.

[21] Appl. No.: 273,741

[22] Filed: Jul. 12, 1994

[51] Int. Cl.⁶ .................................................. B60K 13/02
[52] U.S. Cl. ................................... 180/68.3; 123/198 E
[58] Field of Search ............................. 180/68.3, 68.4, 180/68.1, 69.21; 123/198 E

[56] References Cited

U.S. PATENT DOCUMENTS

| | | | |
|---|---|---|---|
| 4,778,029 | 10/1988 | Thornburgh | 180/68.3 |
| 4,932,490 | 6/1990 | Dewey | 180/68.3 |
| 4,971,172 | 11/1990 | Hoffman et al. | 180/68.3 |
| 5,042,603 | 8/1991 | Olson | 180/68.3 |
| 5,195,484 | 3/1993 | Knapp | 180/68.3 |
| 5,251,712 | 10/1993 | Hayashi et al. | 180/68.3 |

*Primary Examiner*—Karin L. Tyson
*Attorney, Agent, or Firm*—Walter A. Hackler

[57] ABSTRACT

An air intake filter for an internal combustion engine disposed in an automobile engine compartment beneath the hood, behind the radiator, generally includes a housing with an upper and a lower portion which provides an intake for air in front of the radiator for scooping undisturbed air flow and communicating the same to the engine. A filter is provided and disposed between the upper and lower housing portions for removing solid particulates from air intake and, importantly, the housing is configured for separating water from the air entering the intake before the air enters the filter.

16 Claims, 3 Drawing Sheets

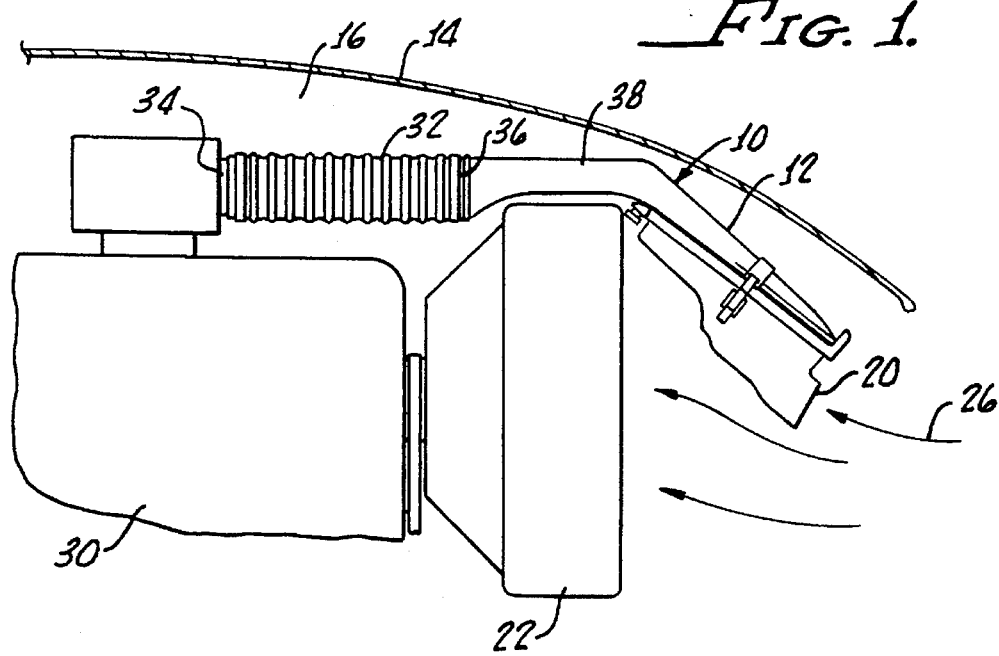
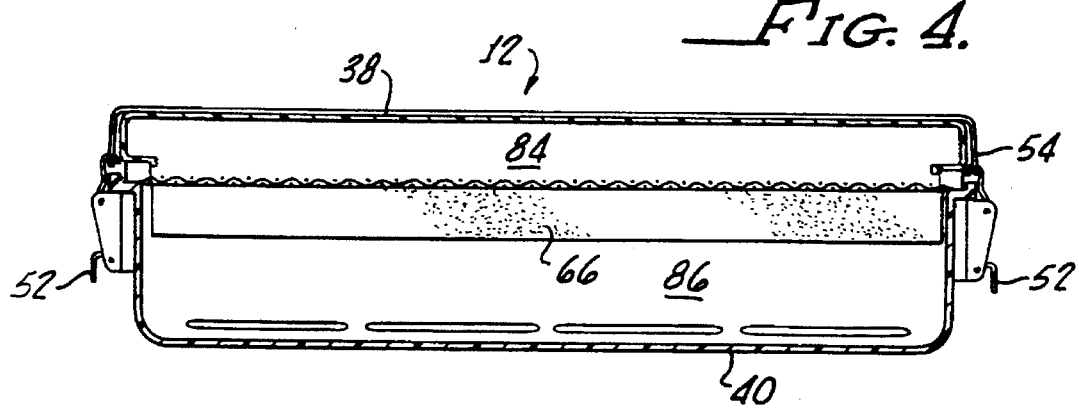

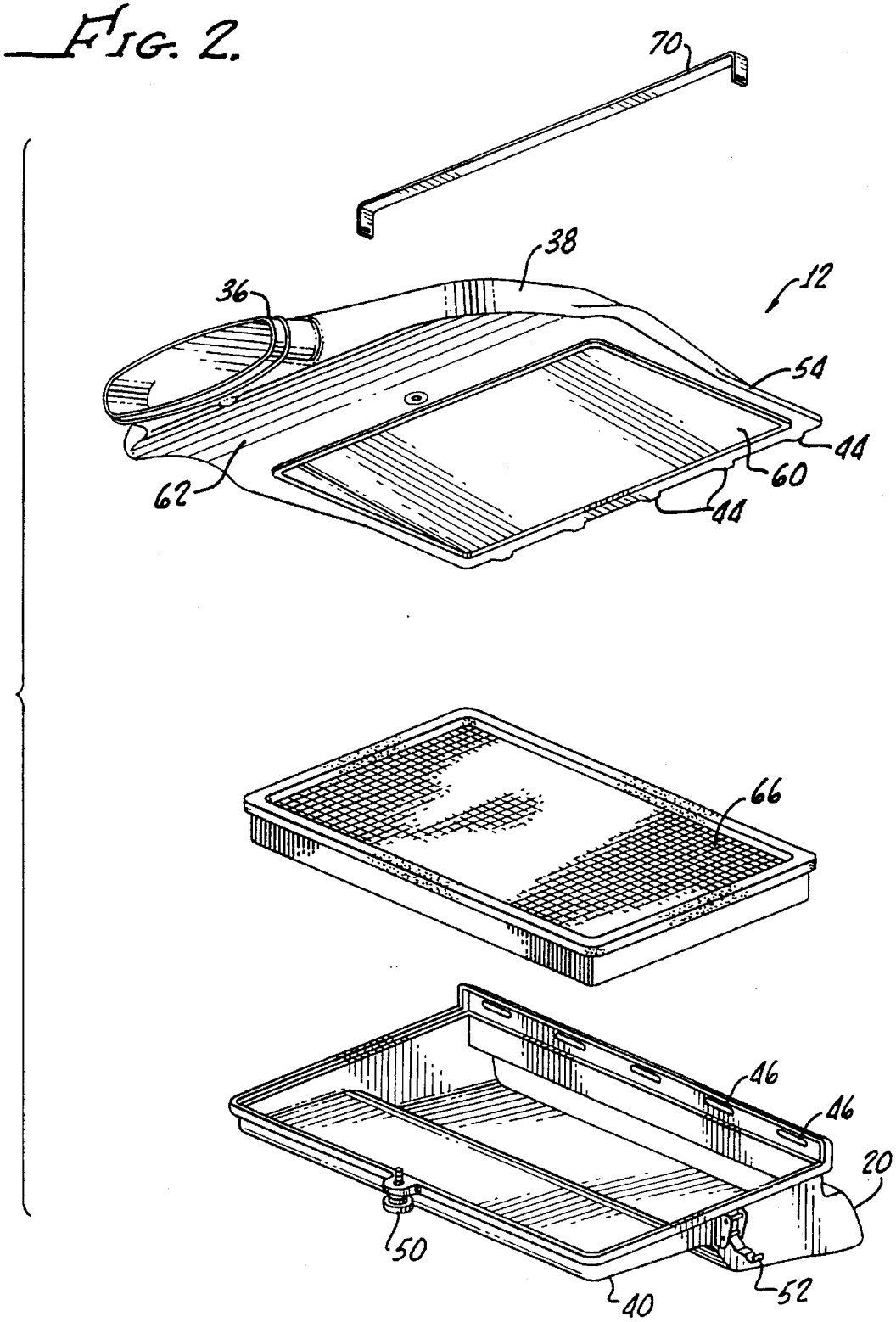

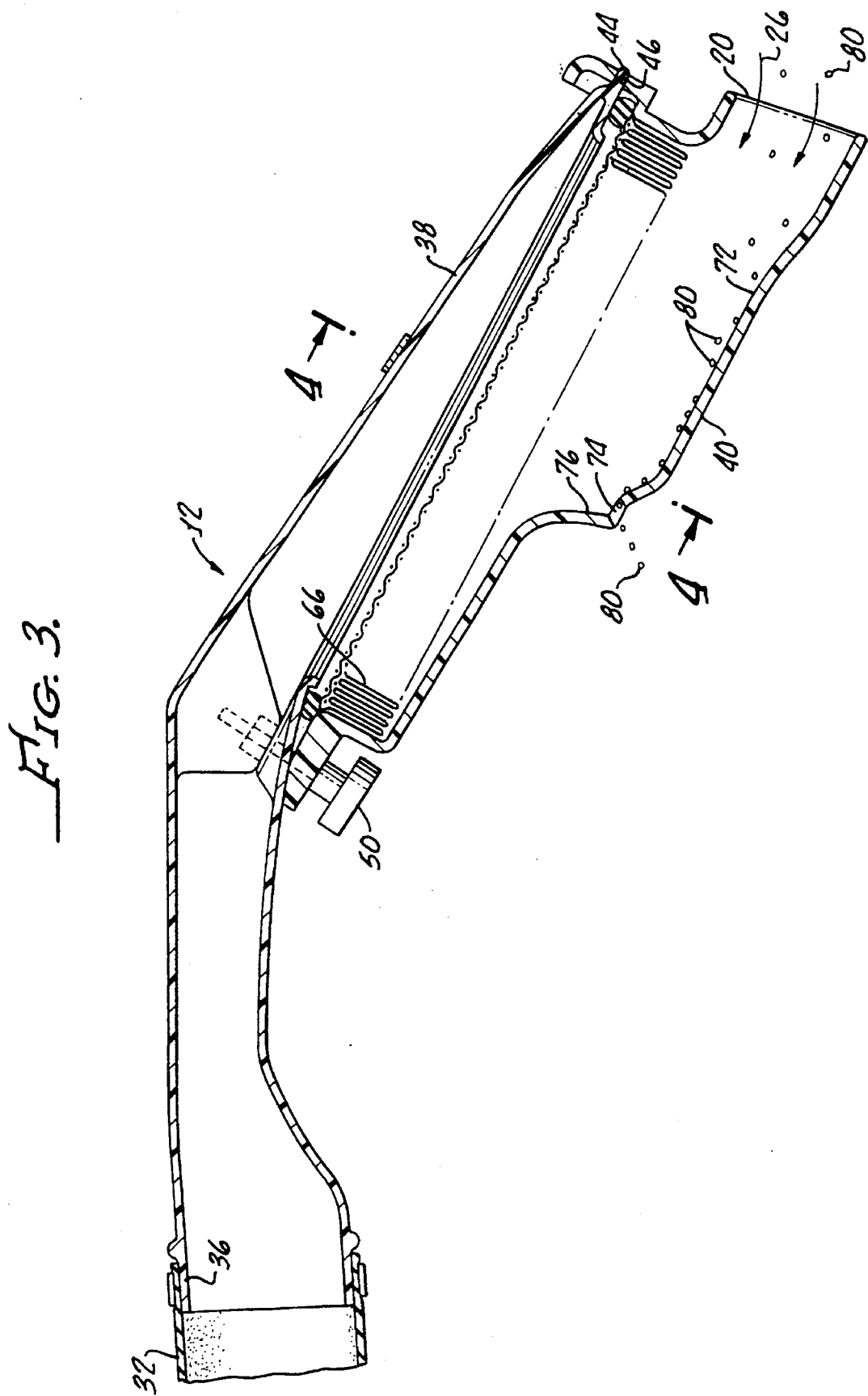

AIR FILTER HOUSING FOR AUTOMOBILE INTERNAL COMBUSTION ENGINE

The present invention generally relates to the field of intake air systems for internal combustion engines and more particularly to an air filter and intake air scoops for automobile engines.

Internal combustion engines found on most automobiles, particularly high-performance automobiles such as Corvettes and the like, generally intake-large volumes of air at a relatively rapid rate which is mixed with vaporized gasoline and supplied to the firing cylinders of the engine.

Inefficiencies in the intake of air caused by turbulence in the engine compartment results in a reduction of engine power. One cause for this air flow turbulence is the impingement of air onto a radiator which is typically disposed in the forward portion of the engine compartment in front of the engine. Thus, air entering the engine compartment must first pass over the radiator and at high speeds, a great amount of turbulence in the air is created.

This turbulence reduces the volumetric flow of intake air into the engine which is restricted over that which would be the case if the air could be taken in from laminar or stagnant air which is present, for example, in front of the radiator.

Prior attempts to gather such undisturbed air have been made and include apparatus which extends through the hood of the vehicle in order to intake air from outside the engine compartment.

The present invention is directed to an air filter which enables up to fifty percent greater air flow and increased horsepower gained by drawing air from the undisturbed air flow in front of the radiator of an automobile.

SUMMARY OF THE INVENTION

In accordance with the present invention, an air intake filter for an internal combustion engine, disposed in an automobile engine compartment, beneath the hood, behind the radiator exposed to air entering the compartment, generally includes a housing sized for mounting beneath the hood with means for intaking air in front of the radiator so that the air enters the housing before becoming turbulent by the radiator. Because the housing is sized for mounting beneath the hood, no modification to the automobile exterior is necessary which may distract from the overall appearance of the automobile and further increase the cost of installation of the air intake system.

In addition, the present invention includes, in combination with the housing, means for communicating the air entering the housing to the internal combustion engine.

More particularly, in accordance with the present invention, the housing comprises an upper portion and a removable lower portion with the removable lower portion including the means for intaking air. In addition, removable filter means may be provided and disposed between the upper and lower housing portions for removing solid particulates from the air entering the means for intaking air. Since the lower portion of the housing is removable, replacement of the filter means is facilitated.

The means for intaking air may comprise a rectangular port, and the air intake in accordance with the present invention may further include means, disposed in the removable lower portion, for separating water from the air entering the rectangular port. This is important since water entering the housing and impinging the filter may significantly reduce the filter efficiency and further decrease the air flow through the filter, when wet, thus depriving the internal combustion engine from necessary intake air.

More particularly, the means for separating the water includes a planar interior surface at the lower portion of the housing which forms at one side a rectangular port. In addition, the internal surface is disposed at an acute angle with the rectangular port in order to cause air entering the port to be impinged thereon.

Disposed at a point removed from the rectangular port is a rear wall which joins the internal surface at an angle of about 90° and includes at least one aperture therethrough for enabling water impinging onto the internal surface to exit the housing before entering the filter means.

BRIEF DESCRIPTION OF THE DRAWINGS

The advantages and features of the present invention will be better understood by the following description when considered in conjunction with the accompanying drawings in which:

FIG. 1 is an illustration of the present invention as it may be installed within an engine compartment and beneath a hood with portions thereof extending from the radiator;

FIG. 2 is an exploded perspective view of the present invention showing an upper portion, a lower portion, and a filter disposed therebetween;

FIG. 3 is a cross-sectional view of the air intake in accordance with the present invention showing air flow patterns and the separation of water from intake air before entering the filter; and FIG. 4 is a cross-sectional view taken along the line 4—4 of FIG. 3.

DETAILED DESCRIPTION

Turning now to FIG. 1, there is shown an air intake 10, in accordance with the present invention, which generally includes a housing 12 which is sized for mounting beneath a hood in an engine compartment 16 which has a rectangular air intake 20 disposed in front of a radiator 22 for scooping undisturbed air flow indicated by the arrow 26 and delivering the same to an internal combustion engine 30 through a tube 32 connecting an engine air intake 34 with a rear 36 of an upper housing portion 38.

As more clearly shown in FIG. 2, the housing 12 includes the upper portion 38 and a removable lower portion 40 which is attached to the upper portion 38 by means of a plurality of tabs 44 and notches or holes 46, a screw 50 and a latch 52 which engages a rim 54 on the upper portion 38.

The upper and lower portions 38, 40 of the housing may be formed from any suitable material such as fiberglass, or plastic, etc. An opening 60 in an underside 62 of the upper housing is sized for accepting an air filter 66 which is held in position between the upper and lower portions 38, 40 when the lower portion 40 is assembled to the upper portion 38. Thus, the present invention conveniently provides an easy access to the filter for routine replacement thereof. One or more brackets 70 may be provided for securing the housing 12 in the engine compartment 16 beneath the hood 14.

Turning now to FIG. 3, the lower portion 40 includes a planar inner surface 72 which forms one side of the air intake 20 and an opening 74 in an upstanding wall 76 which provides a means for separating water 80 from the air 26 entering the rectangular port 20. Since the surface 72 is disposed at an acute angle to the opening 20, water 80 impinges thereon and is forced by the incoming air 26 to the opening 74 and therethrough, as indicated in FIG. 3. This prevents the water 80 from entering the filter 66 and saturating the same, which may cause some undesirable restriction of air flow therethrough.

FIG. 4 shows a cross-section of the housing 12 and it can be seen therefrom that the large width of the upper and lower portions 38, 40 provide for large air channels 84, 86 for delivering air through the tube 32 and to the engine intake 34 with minimum turbulence of the air which ultimately results in increased for the engine 30.

Although there has been hereinabove described a specific arrangement of an air intake in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. An air intake filter for an automobile having an internal combustion engine disposed in an automobile engine compartment beneath a hood and behind a radiator exposed to air entering the compartment, said radiator causing turbulence in the air entering the compartment when the automobile is in motion, said air intake filter comprising:

a housing sized for mounting beneath the hood and having means for intaking air in front of said radiator, said air entering the housing before becoming turbulent due to flow around the radiator, said housing comprising an upper portion and a removable lower portion and said removable lower portion including the means for intaking air; and means for communicating air entering the housing to said internal combustion engine.

2. The air intake filter according to claim 1 further comprising removable filter means, disposed between said upper and lower housing portions for removing solid particulates from air entering the means for intaking air.

3. The air intake filter according to claim 2 wherein the means for intaking air comprises a rectangular port.

4. The air intake filter according to claim 3 further comprising means, disposed in said removable lower portion, for separating water from air entering the rectangular port.

5. The air intake filter according to claim 9 wherein the means for separating water comprises an internal surface of said removable lower portion and an upstanding wall, abutting the internal surface, having at least one aperture therethrough.

6. The air intake filter according to claim 5 wherein said internal surface is planar.

7. The air intake filter according to claim 6 wherein said internal surface forms one side of the rectangular port.

8. The air intake filter according to claim 7 wherein the upstanding wall joins the internal surface at an angle of about 90°.

9. The air intake filter according to claim 8 wherein said means for communicating air includes tubular means, connecting the housing upper portion and an air intake of said automobile engine for supplying filtered air to said automobile engine from said housing.

10. An air intake filter for an internal combustion engine disposed in an automobile engine compartment beneath a hood and behind a radiator, said air intake filter comprising:

a housing sized for mounting beneath the hood with an air intake thereof positioned in front of said radiator when the housing is mounted beneath the hood;

tubular means, connecting said housing and an air intake of said automobile engine, for supplying filtered air to said automobile engine from said housing;

filter means, disposed in said housing, for removing solid particulates from air entering the housing air intake; and means, separate from said filter means, for separating water from air entering the housing air intake before the entering air enters the filter means comprising an internal housing surface disposed at an acute angle with the housing air intake and at least one aperture disposed in a rear housing wall subtending the internal housing surface.

11. The air intake filter according to claim 10 wherein the internal housing surface is planar.

12. The air intake filter according to claim 11 wherein the rear wall joins the internal surface at an angle of about 90°.

13. An air intake filter for an internal combustion engine disposed in an automobile engine compartment beneath a hood, said air intake-filter comprising:

a housing sized for mounting beneath the hood, said housing comprising an upper portion and a removable lower portion, said lower portion including an air intake;

filter means, disposed between said upper and lower housing portions, for removing solid particulates from air entering the air intake;

tubular means, connecting the housing upper portion and an air intake of said automobile engine, for supplying filtered air to said automobile engine from the housing upper portion; and means, disposed in said removable lower portion, for separating water from air entering the lower portion air intake before the entering air enters the filter means.

14. The air intake filter according to claim 13 wherein the means for separating water comprises an internal surface of said removable lower portion and an upstanding wall, abutting the internal surface, having at least one aperture therethrough.

15. The air intake filter according to claim 14 wherein the upstanding wall joins the internal surface at an angle of about 90°.

16. The air intake filter according to claim 15 wherein the internal surface is planar.

* * * * *